Feb. 17, 1970 A. J. DAHL ET AL 3,496,102
CHROMATOGRAPHIC ANALYSIS METHOD
Filed Nov. 13, 1967 2 Sheets-Sheet 1
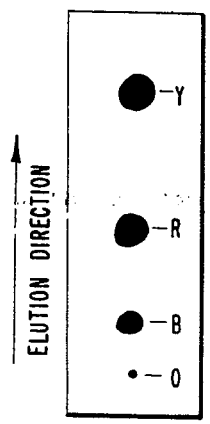
FIG. 1
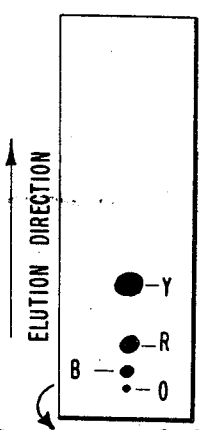
FIG. 2
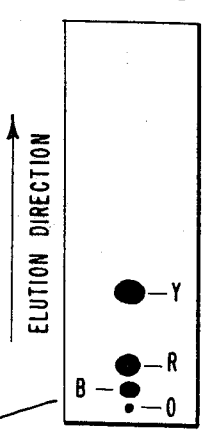
FIG. 3
[ O=ORIGIN   B=BLUE DYE COMPONENT   LEGEND   R=RED DYE COMPONENT   Y=YELLOW DYE COMPONENT ]
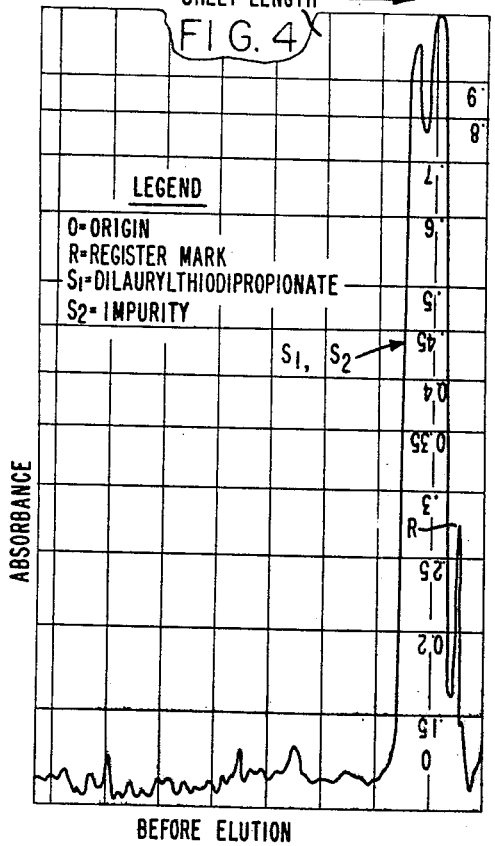
FIG. 4 — BEFORE ELUTION
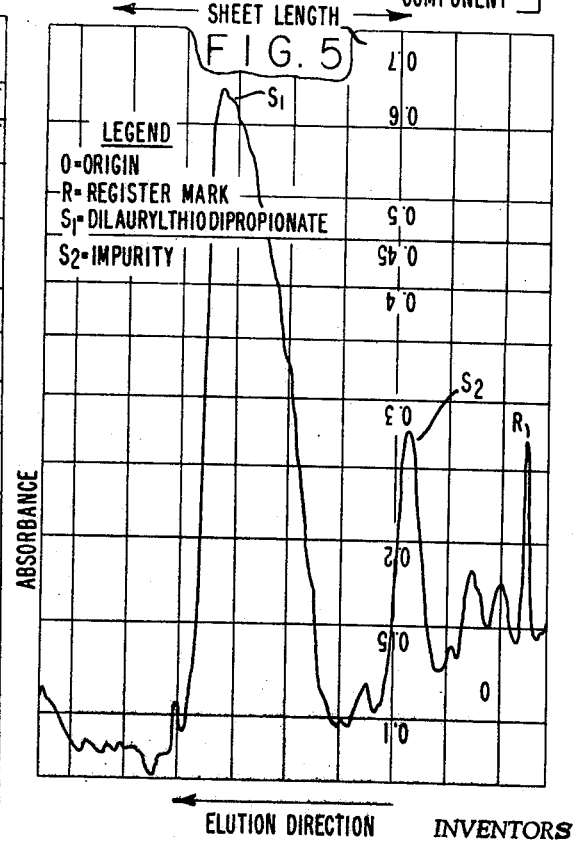
FIG. 5 — ELUTION DIRECTION
INVENTORS
ALTON J. DAHL
HAROLD D. DEVERAUX
BY Michael J. Bradley
ATTORNEY United States Patent Office 3,496,102
Patented Feb. 17, 1970

3,496,102
CHROMATOGRAPHIC ANALYSIS METHOD
Alton J. Dahl and Harold D. Deveraux, Wilmington, Del., assignors to E. I. du Pont de Nemours and Company, Wilmington, Del., a corporation of Delaware
Filed Nov. 13, 1967, Ser. No. 682,098
Int. Cl. B01d 15/08
U.S. Cl. 210—31                                        2 Claims

ABSTRACT OF THE DISCLOSURE

Chromatographic sheeting comprising 15–65 wt. percent of polytetrafluoroethylene resin as a support or binder and 35–85% wt. percent of an inorganic adsorbent and having a porosity of at least 20%, excellent solvent travel time, and that transmits most wavelengths of electromagnetic radiation can be produced by a process in which the polytetrafluoroethylene and adsorbent are co-coagulated from an aqueous medium that can optionally contain from 0 to about 30% by weight of an organic solvent as a lubricant, then formed into a sheet by rolling, optionally washed with a volatile organic solvent to remove dispersing agent from the sheet, dried to remove solvent and heated to relax stresses in the polytetrafluoroethylene.

---

Figure 6:
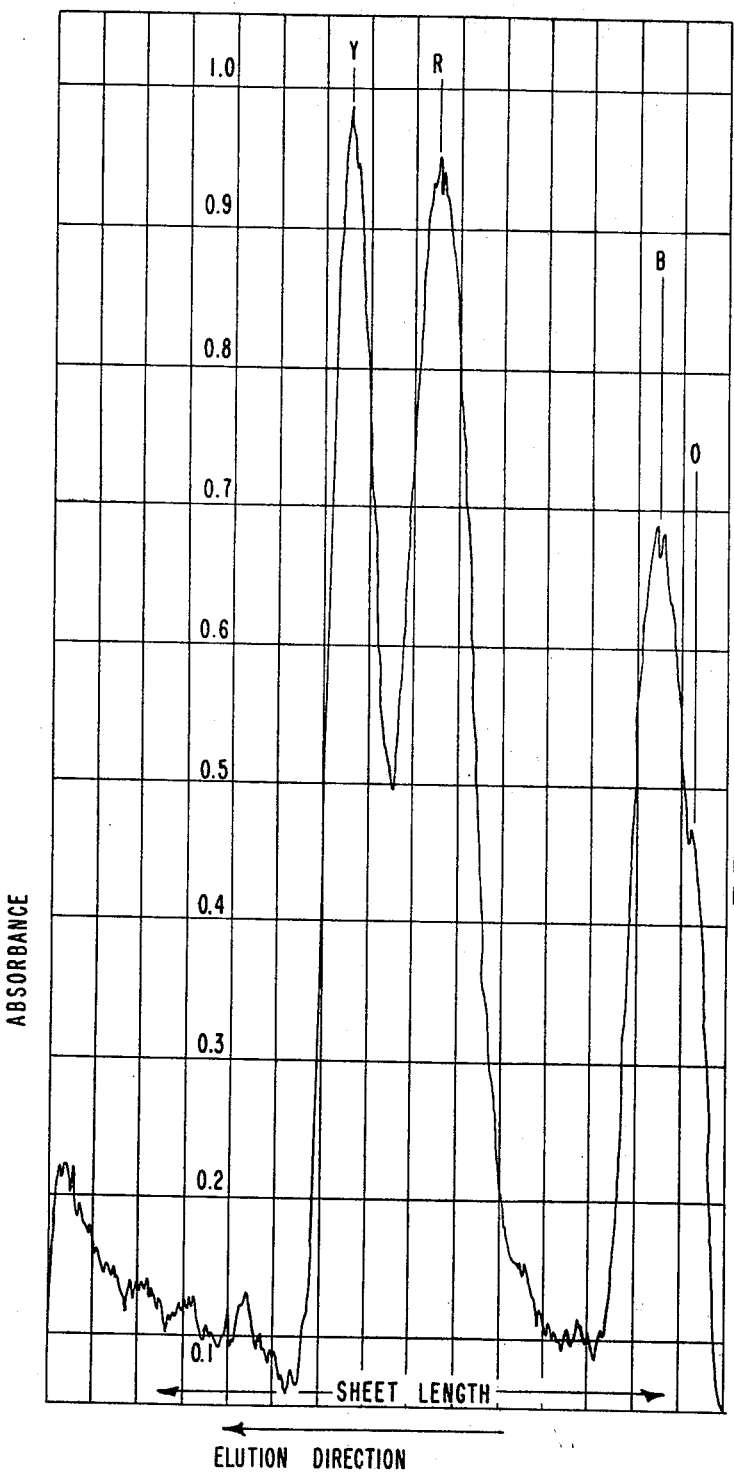

This invention relates to chromatography, and, more particularly, to sheeting useful in chromatographic separation of chemical compounds.

Chromatographic sheeting known heretofore has suffered from one or more disadvantages, including brittleness, chemical reactivity, and non-uniformity of the adsorbent layer. A serious disadvantage of the prior chromatographic systems is that no single system operates as a generally applicable detection system for locating materials which have been separated thereby. Spectrometric detection (i.e., infrared, ultraviolet, etc.) has been difficult, either because of brittleness of the chromatographic sheeting and consequent difficulty in placing it in a spectrometer, or because of the lack of transparency of the adsorbent layer or its support in the region of the spectrum wherein the separated compounds adsorb radiation.

The present invention provides chromatographic sheeting (both thin-layer or analytical and thick layer or preparative) which is chemically inert, stable at temperatures in the range 77–650° K., and has good solvent travel rate (capillary action) and sufficient strength to permit normal handling. Furthermore, the sheeting of this invention has excellent transmission of infrared, visible, and ultraviolet radiation, and consequently allows the detection and quantitive determination of the substances separated, without requiring removal of such substances from the sheeting.

The chromatographic sheeting of the present invention comprises 15–65 weight percent of a polytetrafluoroethylene resin as a support or binder, and 35–85 weight percent of an inorganic adsorbent, said sheeting having a porosity of at least 20%. The present invention also comprises a method for preparing chromatographic sheeting, having the excellent properties described above, comprising the steps of (1) co-coagulating an aqueous dispersion of a polytetraflluoroethylene (PTFE) resin with an inorganic adsorbent in a liquid medium substantially comprising water which can optionally contain from 0 to about 30 wt. percent of an organic solvent as a lubricant, (2) recovering the resultant coagulant and expressing excess fluid therefrom to obtain a doughy mass, (3) rolling the doughy mass to reduce its thickness and obtain sheeting, (4) drying the resultant sheeting to remove the liquid medium, and (5) heating the dried sheeting at a temperature near the melting point of the PTFE resin for at least several minutes. Optimum heating time must be established for each oven and sheeting combination. The sheeting may be optionally washed with a volatile organic solvent such as methanol and acetone after step (3) to remove dispersing agents and lubricants that will not volatilize in step (5).

In the drawings:
FIGURES 1 to 3, inclusive, show chromatograms obtained on separation of a three-component dye mixture on sheeting of the present invention, according to Examples IX, XII, and XIII, respectively,
FIGURES 4 and 5 show infrared scans at 3.4 microns of sheeting of the present invention spotted with commercial dilaurylthiodipropionate before and after, respectively, elution and consequent separation of that compound from an impurity, according to Example XV; and
FIGURE 6 shows an ultraviolet scan of sheeting of the present invention on which a three-component dye mixture has been separated according to Example XVI.

The PTFE support or binder employed in this sheeting comprises PTFE homopolymer and modified PTFE resins such as those of Cardinal et al. U.S. Patent 3,142,655, issued on July 28, 1964, and blends thereof. The sheeting is made using an aqueous dispersion of resin taken from an aqueous synthesis system (i.e., the resin is not isolated prior to use in the process of the present invention).

Aqueous resin dispersions useful in making the sheeting of the present invention are taken directly from resin synthesis according to the methods disclosed in Cardinal et al. U.S. Patent 3,142,655, issued July 28, 1964, Berry, U.S. Patent 2,559,752, issued on July 10, 1961, or Bankoff, U.S. Patent 2,612,484, issued on Sept. 30, 1962. Preferably such dispersions are concentrated, prior to use in the present process, according to the method of U.S. Patent 3,037,953, issued to B. M. Marks and G. H. Whipple on June 5, 1962.

The chromatographic sheeting of this invention, by definition, comprises, in addition to the binder discussed above, an inorganic adsorbent for the materials which are to be eluted on the sheeting. The chemical nature of the adsorbent can be varied widely and still produce the chromatographic sheeting of this invention. Any inorganic adsorbent heretofore known is useful. Inorganic adsorbents commonly used include the following: silica gel, alumina, kieselguhr, magnesium hydroxide phosphate, magnesium trisilicate, calcium hydroxide, calcium phosphate, calcium sulphate, ferric oxide hydrate, etc., and mixtures thereof. Especially useful adsorbents are selected from the class consisting of alumina and silicon-oxygen compounds, the latter being represented by silica, silicates, silicate minerals. An especially attractive adsorbent is silica. The adsorbent particles can be varied in size, but it is preferred that all the particles in a given sheeting sample be of approximately the same size. The particle size of adsorbent used herein can be varied in the range 0.01–200 microns, preferably 0.1–100 microns. The optimum adsorbents are of particle size in the range of about 1–10 microns.

The sheeting of this invention comprises 15–65% (by weight) of polytetrafluoroethylene resin binder, and 35–85% of adsorbent. Compositions with 30–55% binder and 70–45% adsorbent are preferred, when the preferred polytetrafluoroethylene resin and adsorbent are employed.

The ratio of polytetrafluoroethylene resin to adsorbent in the sheeting is varied depending upon the particle size of the adsorbent. Thus, with adsorbents of small particle size (less than 10 microns), a high content of polytetrafluoroethylene resin is required to produce sheeting having optimum strength and solvent travel characteristics. With adsorbents of larger particle size, the amount of polytetrafluoroethylene resin necessary to produce the same results is lower. Generally for any given particle size, an increase in the percent of polytetrafluoroethylene resin in the sheeting gives less brittle sheeting with a slower solvent travel rate, while a decrease in percent of resin results in more brittle sheeting with a faster travel rate.

Illustrative of sheeting compositions which have extremely attractive strength, solvent travel rate, and transmission of electromagnetic radiation are those made from the preferred polytetrafluoroethylene resin dispersion, referred to above, and the following adsorbents (percentage of resin in total resin and adsorbent indicated): Merck Silica Gel H, 30–35% resin; Camag DF–O Silica Gel, 45–50% resin; Applied Science Laboratories Adsorbosil-2 Silica Gel, 40–50% resin; and Corning Porous Glass #7930, 20–25% resin.

Chromatographic sheeting of this invention is produced as follows: The adsorbent and resin are preferably co-coagulated in a medium substantially comprising water, but from 0 to about 30 wt. percent of an organic hydrocarbon lubricant can optionally be mixed with the water to prepare the liquid medium. The hydrocarbon lubricant aids in the rolling of the billet. Minor amounts of other liquids can be present, as well as surfactants, dispersing agents, etc. It is preferred that the adsorbent be mixed with said medium prior to mixture with the dispersion. The coagulant is recovered and excess liquid is expressed therefrom to form a doughy mass. Sheeting formation from the resultant doughy mass can be accomplished, for example, by a series of rolling, folding, and rolling operations as described in Canadian Patents 725,704 and 681,132, both issued to Roberts. This series of operations can result in sheeting of approximately equal strength in two directions (biaxially oriented sheeting). Although the sheeting of the present invention is preferably produced as above, rolling in one direction to final thickness is satisfactory.

The solvent travel times of the product of this process are much less per 10 cm. om solvent travel than are any other filled polytetrafluoroethylene resins for any given solvent. Although this is not intended to be limiting, in the production of the sheeting of this invention, the aqueous medium is believed to wet the adsorbent and thereby to reduce encapsulation and consequent isolation of adsorbent by the binder during the sheeting formation process. This accounts for the good solvent travel time of the chromatographic sheeting of this process.

The sheeting can be of that thickness useful in analysis and referred to as thin-layer sheeting, i.e., in the range 5–20 mils, preferably 6–15 mils, thick. Likewise, the sheeting can be thicker, for use in preparative chromatography, i.e., 20–80 mils thick or thicker.

Adequate solvent travel rate requires that the sheeting be porous. Porosity can be spoken of in terms of the free, void, or interstitial space in the sheeting. To achieve an adequate solvent travel rate the sheeting should have at least 20% porosity. The sheeting of the present invention has at least 20% porosity and preferably 40–70% porosity.

The absorption as measured at $3.4\mu$ of electromagnetic radiation by a chemical compound adsorbed on the product of this invention is approximately 8 times the value which is obtained from an identical amount of the same compound deposited on a finely ground glass plate. The sensitivity enhancement appears to have resulted from the longer path length created by refraction of the light beam from the surfaces of the adsorbent particles.

The following examples are presented to illustrate but not to restrict the present invention. Percentages and parts are expressed by weight unless otherwise noted.

In Examples I – XVI the polytetrafluoroethylene (PTFE) resin employed was supplied to the sheeting preparation as a colloidal dispersion of polytetrafluoroethylene resin having a particle size range of 0.05–0.5 micron and a mean diameter of 0.2 micron. The dispersion contained 60% resin and was stabilized with 6% (by weight of the resin) of a non-ionic surfactant "Triton X-100," available commercially from Rohn and Haas and believed to be a condensation product of ethylene oxide and para-octyl phenyl which contains about 8 ethylene oxide units per phenolic moiety. Such dispersions are made using the initiator of Renfrew U.S. Patent 2,534,058, the dispersing agent of Berry U.S. Patent 2,559,752, the paraffin wax of Bankoff U.S. Patent 2,612,484, and the concentration process of Marks and Whipple U.S. Patent 3,037,953.

The adsorbents employed in Examples I–XVIII were found to be of the following approximate particle sizes (the commercial source being indicated in parenthesis): Camag DF–O silica gel (Camag, Switzerland), Adsorbosil-2 silica gel (Applied Science Laboratories, State College, Pa.), Camag DF–5 silica gel (Camag), and Camag DS–O aluminum oxide (Camag) comprised particles nearly all of which were less than 10 microns in diameter; in Silica Gel H (Merck, N.J.), nearly all the particles were less than 25 microns in diameter.

The approximate porosity of the chromatographic sheeting was determined by (1) weighing the sheeting (2) soaking the sheeting with inert oil (Dow Corning Fluid No. 550) for about 0.5 hour, (3) wiping off excess oil, (4) reweighing the soaked sheeting, and (5) calculating the percent voids in the sheeting based on volume of oil adsorbed.

The approximate porosity of sheeting of the type produced in Examples I–V was found to be in the range of 52–58%.

Example I

Chromatographic sheeting was prepared as follows:
(a) 5.0 gm. Adsorbosil–2 silica gel was mixed to a paste with distilled $H_2O$.
(b) 2.0 ml. (3.0 gm.) aqueous PTFE dispersion was added to the silica gel paste and the resulting mixture was stirred until it began to thicken. It was stirred rapidly with a spatula until the consistency approached that of chewing gum.
(c) The mixture was then placed between layers of paper towels to blot out excess water and form it into a wafer or billet.
(d) The billet was then heated for 20 minutes at 100° C. to dry it further.
(e) The billet was then washed for 10 minutes with gentle agitation in acetone.
(f) The billet was then rolled wet with acetone in a series of steps, with a 4–5 mil reduction in thickness with each successive step, to form a sheet approximately 10 mils thick.
(g) The resulting sheet was in succession heated for 15 minutes at 100° C., heated for 4 minutes at 450° C., and then cooled to room temperature and cut to size.

Example II

The sheeting of this example was prepared as in Example I with the exceptions in the listed steps of Example I as follows:
(b) 3 ml. (4.5 gm.) aqueous PTFE dispersion was added to the silica gel in place of 2 ml. (3.0 gm.) aqueous PTFE dispersion.
(f) In place of step (f) the billet was removed from the acetone wash, blotted free of excess acetone, immersed in distilled water to thoroughly wet it and then rolled wet in a series of steps with 4–5 mil reductions in thickness with each sucessive step, to form a sheet approximately 8 mils thick.
(g) The sheeting was heated for 15 minutes at 300° C. in place of the heating for 4 minutes at 450° C.

Example III

Chromatographic sheeting was prepared as follows:
(a) 5.2 gm. Camag DF–5 silica gel was mixed with distilled $H_2O$ to form a paste.

(b) 8.0 gm. aqueous PTFE dispersion was added and the mixture was stirred until it thickened to the consistency of chewing gum.

(c) The mixture was formed into a wafer or billet approximately 3/32" thick.

(d) The billet was blotted with paper towels to remove the excess $H_2O$ and then dried for 15–20 minutes at 100° C.

(e) The billet was rolled to form a sheet about 30 mils thick, then folded double and rolled at a right angle to the previous roll to about 30 mils thickness.

(f) Step (e) was then repeated.

(g) The sheet was then rolled, at a right angle to the previous roll, in successive 4–5 mil reductions to a thickness of about 8 mils.

(h) The sheet was heated for 30 minutes at 290–292° C. in a muffle furnace and then cut to size.

Example IV

Chromatographic sheeting was prepared as follows:

(a) 5 gm. Camag DF–0 silica gel was mixed with distilled $H_2O$ to form a paste.

(b) 8.3 gm. aqueous PTFE dispersion was added and the mixture was stirred until it thickened to the consistency of chewing gum.

(c) The wet mixture was rolled to a sheet having a thickness of 35–40 mils.

(d) The sheet was folded double and rolled to a thickness of 35–40 mils.

(e) Step (d) was repeated 3 times.

(f) The sheet was then rolled in successive steps to a thickness of 8–10 mils, by reducing the thickness by approximately 3–5 mils for each step.

(g) The sheet was washed for 8–10 minutes in acetone twice and then washed for 8–10 minutes in 25–30 ml. of acetone containing 2–3 ml. concentrated HCl.

(h) The sheet was washed for 8–10 minutes in 25–30 ml. of acetone containing 2–3 ml. of $NH_4OH$ (28%) and then heated at 100° C. until $NH_4OH$ could not be detected by smell.

(i) The sheet was heated for 15 minutes at 340° C. and then cut to size.

(j) The sheet was exposed to $NH_4OH$ vapors before use.

Example V

The preparative details of this example were the same as for Example III steps (a) through (h) except that in step (a) 5 gm. Merck Silica Gel H was used in place of the 5.2 gm. of Camag DF–5 silica gel and in step (b) 3 ml. (4.5 gm.) aqueous PTFE dispersion was used in place of the 8 gm. aqueous PTFE dispersion. In addition, the sheet was treated as follows:

(i) The sheet was washed in 25–30 ml. acetone for 1½ hours. The washing was repeated 2 more times.

(j) After the third washing the acetone was allowed to evaporate from the sheet and then the sheet was heated for 25 minutes at 300° C.

(k) The sheet was cut to size and then exposed to 28% $NH_4OH$ vapors for 5 minutes. The sheet was exposed to the atmosphere until the odor of $NH_4OH$ could not be detected by smell before use.

Example VI

The preparative details were the same as for Example V for steps (a) through (i) except that in (a) 5 gm. Camag DF–O silica gel was used instead of Merck Silica Gel H, (b) 8.3 gm. aqueous PTFE dispersion was used, and (i) the washings were for only 8–10 minutes and the third one contained 2–3 ml. of concentrated HCl in the acetone. The following steps were performed in addition:

(j) The sheet was washed for 8–10 minutes in 25–30 ml. of acetone containing 2.3 ml. of 28% $NH_4OH$ and then heated at 100° C. until $NH_4OH$ could not be detected by smell.

(k) The sheet was heated for 15 minutes at 340° C. in a muffle furnace then cut to size.

(l) The sheet was exposed to $NH_4OH$ vapors for 5 minutes before use.

Example VII

Chromatographic sheeting was prepared as follows:

(a) 10 gm. aluminum oxide (Camag DS–O) was mixed with 6 gm. distilled $H_2O$ and the mixture was stirred for 2 minutes.

(b) 10 gm. aqueous PTFE dispersion was added with stirring to form a smooth creamy paste.

(c) The mixture was heated to a gentle boil with constant stirring until it began to thicken. It was removed from the heat and stirred vigorously until it thickened to the consistency of chewing gum.

(d) The wet mixture was formed into a billet approximately ¼" thick and then rolled to a thickness of ⅛".

(e) The billet was folded double and rolled again to a thickness of ⅛".

(f) Step (e) was repeated 7–9 times.

(g) The billet was then rolled to reduce the thickness in successive increments of 4–5 mils to form a sheet 10 mils thick.

(h) The sheet was washed in methanol for 24 hours with gentle stirring.

(i) The sheet was then dried free of methanol, heated for 30 minutes at 330° C. and cut to size.

Example VIII

Chromatographic sheeting thicker than that of Examples I–VII, i.e., chromatographic sheeting referred to as of "preparative" thickness, was made as follows:

(a) 15.0 gm. Silica Gel H was placed in a 1-liter high-speed blender (Osterizer), and distilled water was added. The mixture was stirred at "low" speed for 1 minute, then the blender was shut off.

(b) 15 gm. aqueous PTFE dispersion was added to the blender and the mixture was stirred at "low" speed until co-coagulation occurred (less than 1 minute) to form a thick coherent mass.

(c) The resultant mixture was removed and manually kneaded until it stiffened to the consistency of chewing gum, then pressed into a billet about 7–8 ml. thick.

(d) The billet was placed between paper towels to remove excess water, then rolled to a thickness of about 4 millimeters.

(e) The rolled billet was folded double, then re-rolled to 4 ml. thickness. The folding and rolling process was repeated for a total of 4 folds.

(f) The rolled billet was then re-rolled to a final thickness to 2 millimeters, in reductions of about 0.5 mm., to produce sheeting.

(g) The sheeting was then soaked in water-methanol (50-50 by volume) 3 times for 2 hours each soaking, then soaked overnight in a fresh solution of the same composition. The sheeting was then soaked thrice in acetone for 2 hours, then dried free of acetone.

(h) The resultant dried sheeting was heated for 15 minutes at 316° C. in a muffle furnace to prepare it for use.

Examples IX–XIV

Chromatographic sheeting manufactured according to Examples I–V and VII was employed to evaluate visually the separation of a dye mixture on sheeting of this invention. The sheeting had adequate strength, i.e., it did not break while being handled.

Sheeting was spotted with 5 microliters of a three-component test dye mixture, then suspended in a 12-ounce bottle containing 10 ml. of solvent as shown in Table 1. The elution procedure is described in E. Stahl, "Thin Layer Chromatography," English edition, Academic Press, New York, 1965, page 18. (Item 3a, A.) The test dye mixture contained 50 mg. p-dimethylamino-azobenzene (yellow component), 50 mg. Sudan Red G, 50 mg. Indophenol Blue, and 50 ml. of benzene.

Table 1 includes the evaluation of sheeting in terms of resolution of the test mixture employed and the time required for 10-cm. solvent travel. FIGURES 1 to 3 show the reproductions of chromatograms obtained in Examples IX, XII, and XIII, respectively.

Example XV

The sheeting of Example IV was evaluated by analyzing commercial dilaurylthiodipropionate thereon using chloroform as the solvent. A solution of 100 micrograms of dilaurylthiodipropionate in 2 microliters of chloroform was deposited at the origin and separated (eluted) as in Examples IX–XIV. The sheeting was eluted in chloroform according to the method of Stahl used in Examples IX–XIV. FIGURES 4 and 5 show scans at 3.4 microns of sheeting before and after elution, respectively. The infrared scan of sheeting on which the mixture had been separated shows excellent separation of the propionate from several percent of an impurity. Both scans demonstrate the excellent infrared transmission of the sheeting.

TABLE 1.—EVALUATION OF CHROMATOGRAPHIC SHEETING

| Example | Preparation of sheeting employed (example) | Material to be separated | Solvent | Resolution | Time required 10 cm. solvent travel (min.) |
|---|---|---|---|---|---|
| IX | I | Dye mixture | Benzene | Slightly smeared | 48 |
| X | II | do | do | do | 19 |
| XI | III | do | do | Compact, well-defined | 156 |
| XII | IV | do | do | do | 88 |
| XIII | V | do | do | do | 88 |
| XIV | VII | do | Chloroform | do | 210 |
| XV | IV | Commercial dilaurylthiodipropionate | do | Well-defined | 88 |

Example XVI

This example shows that the sheeting of this invention has good transmission of ultraviolet radiation and permits ultraviolet evaluation of samples separated thereon. Sheeting was prepared and heated according to the method of Example VI employing the following quantities of materials: 50 gm. Adsorbosil–2 silica gel, 83 gm. of PTFE dispersion, and 100 additional grams of water, for a fluorocarbon-adsorbent weight ratio of 50-50.

The sheeting was evaluated employing the chromatographic separation procedure of Example IX, except that 2 microliters, rather than 5 microliters, of the test solution was employed. The resultant sheeting was examined in the ultraviolet at 275 millimicrons. The ultraviolet scan (FIGURE 6) shows the excellent transmission of the sheeting and separation of the mixture.

In Examples XVII and XVIII the polytetrafluoroethylene (PTFE) resin employed was supplied to the sheeting preparation as a colloidal dispersion of polytetrafluoroethylene resin having a particle size range of 0.05–0.5 micron and a mean diameter of 0.2 micron. The dispersion contained 35% resin and was stabilized for shipping purposes with 4% (by volume) of an immiscible oil which floats on the surface. No wetting agents were added. Such dispersions are made using the method of Cardinal et al., U.S. Patent 3,142,665.

Example XVII

Chromatographic sheeting was prepared as follows:

(a) 59 gm. of aqueous PTFE dispersion was mixed by stirring with 22 gm. of silica gell adsorbent (Camag DS–O).

(b) 25 gm. distilled water was added and the mixture was stirred vigorously with a spatula for several minutes.

(c) The mixture was pressed between layers of paper towels to remove excess water and then it was formed into a billet approximately 9/16″ thick.

(d) The billet was rolled to reduce the thickness by one half. After each of the first two or three passes through the rolls, the billet separated into several pieces. The pieces were stacked, then rolled again. The process was repeated until a cohesive billet was obtained (total of 4–5 passes through the rolls).

(e) The billet was soaked in methanol for 30 minutes, then rolled to reduce the thickness by one half.

(f) The billet was folded double, wetted with methanol, and then rolled again to reduce the thickness by one half. The process was repeated until a total of six folds and rolls were made.

(g) The billet was rolled to final thickness of 10–12 mils in successive passes through the rolls, reducing the thickness by approximately one half on each pass. The billet was wetted with methanol before each pass.

(h) The sheeting was dried free of methanol, then heated, without washing, for thirty minutes at 332° C. and then cut to size.

Example XVIII

Chromatographic sheeting was prepared as follows:

(a) 59 gm. aqueous PTFE dispersion and 22 gm. of silica gel adsorbent (Camag DS–O) were mixed by stirring with a spatula.

(b) 25 ml. of methanol was added and the mixture was stirred vigorously with a spatula for several minutes.

(c) A portion of the mixture was transferred to a mold which has a cavity 0.5 inch wide x 2.5 inches long x 0.75 inch deep. The mixture was packed into the cavity with a spatula to a depth of 0.25–0.38 inch.

(d) The mixture was pressured to 1000 p.s.i. of surface area (surface area=1.25 inches) to form a cohesive billet. The billet was soaked in methanol for 5 minutes, then passed through the rolls three successive times reducing the thickness by 25% on each pass.

(e) The billet was wet with methanol, then folded double and rolled to reduce the thickness by one half. The process was repeated until a total of five folds were achieved.

(f) The billet was rolled, wet with methanol, to final thickness of 10–12 mils in successive steps, reducing the thickness by approximately one half on each pass through the rolls.

(g) The sheeting was dried free of methanol, then heated, without washing, for thirty minutes at 332° C. and then cut to size.

We claim:

1. In the process of chromatographically analyzing a multicomponent chemical solution by placing said solution on a chromatographic sheet, eluting the components of said solution on said sheet, analyzing by transmission of electromagnetic radiation said eluted components on said sheet, the improvement comprising conducting the chromatographic analysis with a chromatographic sheeting comprised of a matrix of polytetrafluoroethylene and inorganic adsorbent particles held in said matrix.

2. The process of claim 1 having the added improvement of making said transmission analysis of said components at ultraviolet, visual and infrared wave lengths transmitted by said sheeting.

References Cited

UNITED STATES PATENTS

| 2,723,756 | 11/1955 | Miller et al. | 210—198 X |
| 3,158,532 | 11/1964 | Pall et al. | 210—504 X |
| 3,279,307 | 10/1966 | Wilks | 210—198 X |
| 3,303,043 | 2/1967 | Halpaap et al. | 210—198 X |

JAMES L. DECESARE, Primary Examiner

U.S. Cl. X.R.

210—198